T. J. LEVEY.
BOTTLE CAPPING MACHINE.
APPLICATION FILED APR. 6, 1914.

1,160,084.

Patented Nov. 9, 1915.
6 SHEETS—SHEET 1.

T. J. LEVEY.
BOTTLE CAPPING MACHINE.
APPLICATION FILED APR. 6, 1914.

1,160,084.

Patented Nov. 9, 1915.
6 SHEETS—SHEET 5.

Inventor
T. J. Levey
Attorney

UNITED STATES PATENT OFFICE.

THOMAS J. LEVEY, OF BALTIMORE, MARYLAND, ASSIGNOR TO INTERNATIONAL CAP AND SEALING MACHINE CO., OF HIGHLANDTOWN, MARYLAND, A CORPORATION OF MARYLAND.

BOTTLE-CAPPING MACHINE.

1,160,084.  Specification of Letters Patent.  Patented Nov. 9, 1915.

Application filed April 6, 1914. Serial No. 830,018.

*To all whom it may concern:*

Be it known that I, THOMAS J. LEVEY, a citizen of the United States, residing at Baltimore, in the State of Maryland, have invented certain new and useful Improvements in Bottle-Capping Machines, and I do hereby declare the following to be a full, clear, and exact description of the invention, such as will enable others skilled in the art to which it appertains to make and use the same.

This invention relates to bottle capping machines, and has for its object to provide an apparatus which will be simple in construction, certain in action, comparatively inexpensive to manufacture and one which will be more efficient in operation than those heretofore proposed.

With these and other objects in view the invention consists in the novel details of construction and combinations of parts, more fully hereinafter disclosed and particularly pointed out in the claims.

Referring to the accompanying drawings forming a part of this specification, in which like numerals designate like parts in all of the views: Fig. 9 is a longitudinal sectional view of the cap distributer shown in Fig. 8; Fig. 10 is a longitudinal sectional view partly broken away of the parts taken on a plane at right angles to the plane on which Fig. 9 is taken; Fig. 11 is a cross sectional view of the parts shown in Figs. 8 and 9 taken on a plane near the lower end of Fig. 9.

Figure 1:
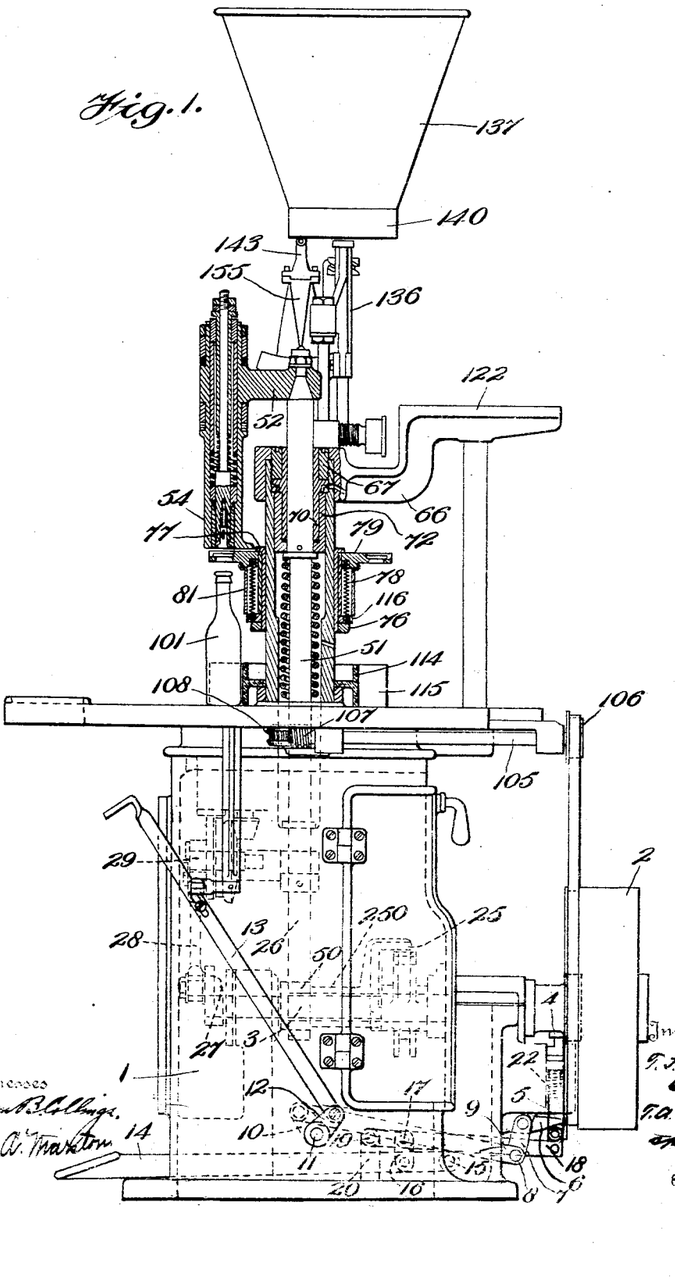
Figure 1 is a side elevational view partly in section of a machine built in accordance with my invention.

1 indicates any suitable bed or framework on which is mounted a power pulley 2 provided with a shaft 3 and clutch member 4 operated by the spring controlled reciprocating rod 5 controlled by the dog or lever 6, operated by the link 7 pivoted at 8 to the rod 9, which in turn is pivoted to the lever 10 on the shaft 11 carrying the lever 12 under control of the operating handle 13. Said clutch controlling rod 5 is also operated from the foot lever 14 pivoted at 15 and carrying the link 16 pivoted at 17 to the lever 18 pivoted at 19 to the standard 20 rising from the base of the machine. The extreme end of the lever 18 is joined to the lower end of the rod 5 as will be clear from Fig. 1 of the drawing.

The clutch member 4 is of any usual suitable construction and when the hand lever 13 or the foot lever 14 is operated, the said clutch 4 will cause the power pulley 2 to be fast on the shaft, while when the hand lever 13 or foot lever 14 is not operated, the spring 22 will cause said clutch member 4 to disengage the pulley 2 from the shaft, 3, all in a manner well known, and not, therefore more specifically disclosed herein.

Carried by the shaft 3 is a friction clutch member designated as a whole by the numeral 25 and which is fully disclosed in my U. S. Patent No. 997,142, dated July 4, 1911, and entitled Bottle capping machine. As disclosed in said patent the continuous revolution of one member of this clutch with the shaft 3, will cause the revolution of the second member, but upon an undue strain manifesting itself, the said members will disengage and automatically reëngage on the next revolution, so that injury to the machine is avoided. My said patent above also makes it clear how a reciprocating motion is imparted to the bottle capping head through the sleeve 250 of this clutch and the rack 26, so that no further description will be needed. In other words, it often happens in capping bottles that one bottle may be longer than another or for other causes that the capping head is interrupted in its descent, and the power coming from the pulley 2 is liable to break the machine. To avoid this, the clutch 25 will transmit sufficient power to normally cap the bottles, but when an extraordinary or abnormal power develops sufficient to injure the machine, the clutch 25 disengages and injury to the machine is avoided. The shaft 3 further carries the crank arm 27 pivoted to the link or pitman 28 best shown in Figs. 2 and 12 which pitman is pivoted at 29 to the lever 30 provided with the stud 31, on which is mounted the arm 32 to which is pivoted the dog 33 adapted to engage the ratchet 34 mounted on said stud 31. Also mounted on the stud 31 is the bevel gear 35 engaging the bevel pinion 36 mounted on the shaft 37 carrying the pinion 38. Said pinion 38 engages the gear 39 rigid with the bottle carrying table 40, and rotates the same.

Figures 2, 3:
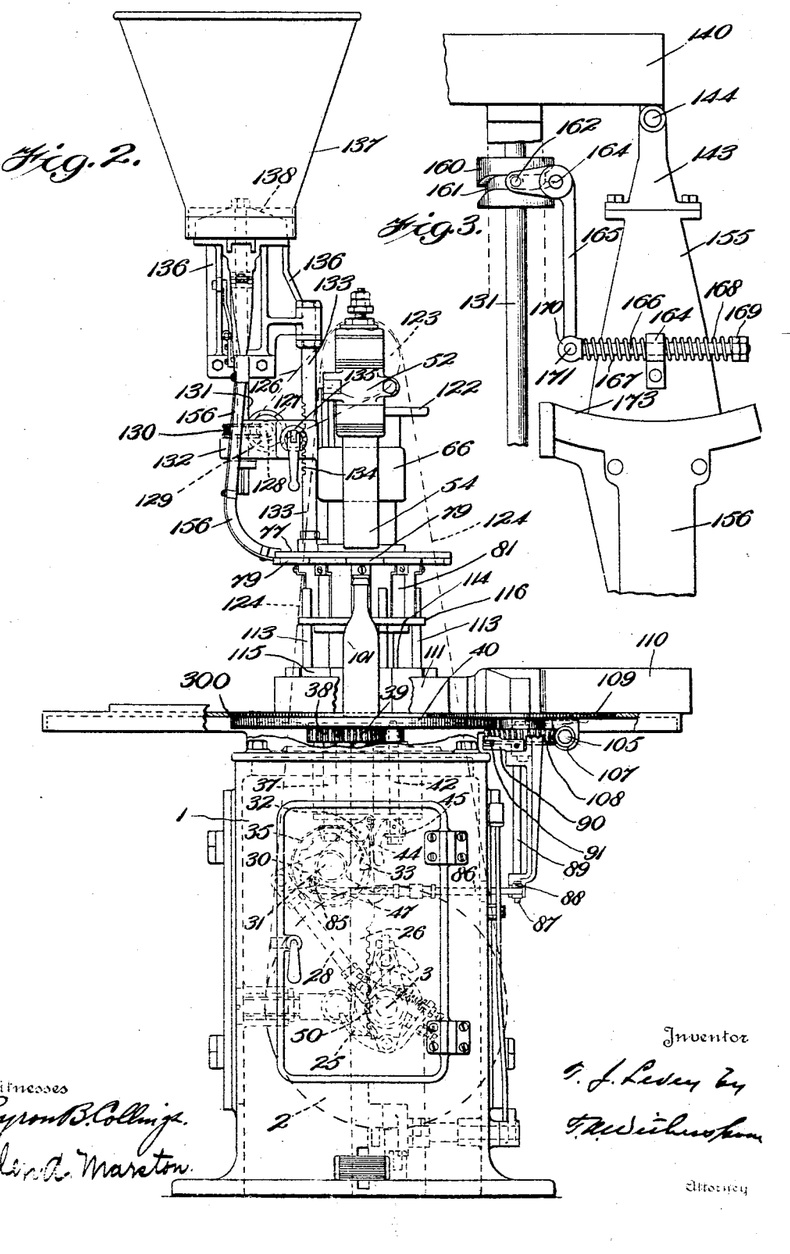
Fig. 2 is an end elevational view of the parts shown in Fig. 1.
Fig. 3 is a detail side elevational view on an enlarged scale of a portion of the cap feeding mechanism.
Figures 12, 13, 14, 15:
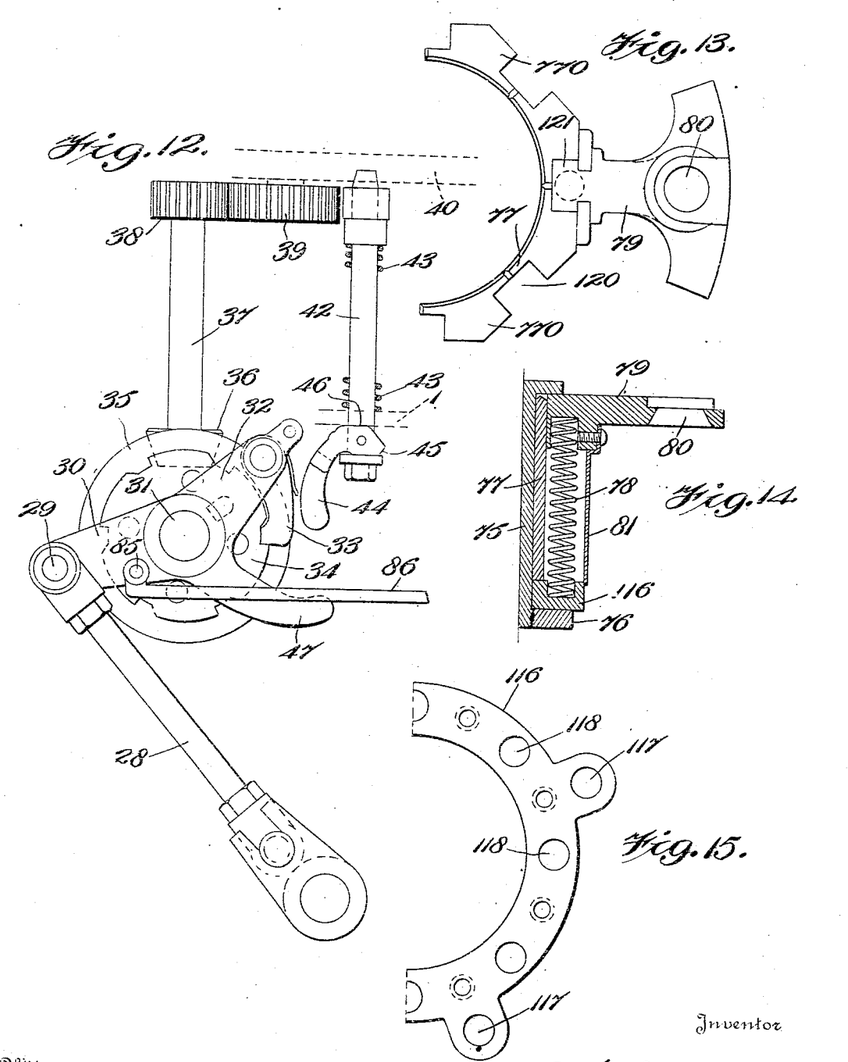
Fig. 12 is an elevational view of a portion of the mechanism for revolving the bottle holding table.
Fig. 13 is a detail plan view of one of the cap holding sectors and its associated parts.
Fig. 14 is a sectional view of the parts shown in Fig. 13.
Fig. 15 is a plan view of a portion of a guide ring.

Mounted on the frame 1 parallel to the shaft 37 is the stop or locking rod 42, Figs. 2 and 12, controlled by a spring 43 and adapted to suitably engage the table 40 by entering a locking hole (not shown) therein and thus lock the table in the positions to which it may be turned by the pinion 38. On the lower end of the rod 42 is the pivoted lever or dog 44 provided with the inclined faces 45 and 46 as shown. Also, mounted on the shaft 31 see Fig. 12 is an arm 47 adapted to be oscillated by the movements of the lever 30 and to contact with the lever 44 and thus turn the same on its pivot. When this contact takes place as will be clear from the drawings the said lever 44 will be turned in a clockwise direction as seen in Fig. 12; and since its surface 46 rests against the frame 1 and a similar surface rests against the lower end of the rod 42, the said rod will be lowered against the compression of the spring 43 and its upper end will be disengaged from a locking hole, not shown in the table 40. But said turning movement of the lever 44 takes place over an angular distance greater than that necessary to disengage the rod 42 from the table 40, so that there is a lost motion involved in this disengagement which permits the table 40 to be rotated by the pinion 38. On the other hand, when the arm 47 moves from its position in contact with the arm 44 to its full line position shown in Fig. 12, the extreme end of the lever 32 will strike the dog 44, while the latter is in its raised position and turn it to such a position that the said spring 43 will complete its return to its former, or full line position shown in Fig. 12.

It will be clear from what has now been disclosed that power being applied to the pulley 2 and the hand operated lever 13 or the foot lever 14 being manipulated, the said pulley will be made fast to the shaft 3, whereupon power will be transmitted through the clutch 25 to the reciprocating rack 26, and also to the crank 27 and pitman 28 to the dog 33, which latter will turn the bevel gear 35 and pinion 38 to rotate the bottle carrying table 40. It will be further clear that as the arms 30 and 47 are thus oscillated the rod 42 will with a lost motion be reciprocated into and out of engagement with the said table 40, so that, the said table will be unlocked while it is being turned, but it will be relocked when the dog or pawl 33 is riding over the ratchet 34, which is the period of capping the bottles and it is not desired to turn said table.

Figure 4:
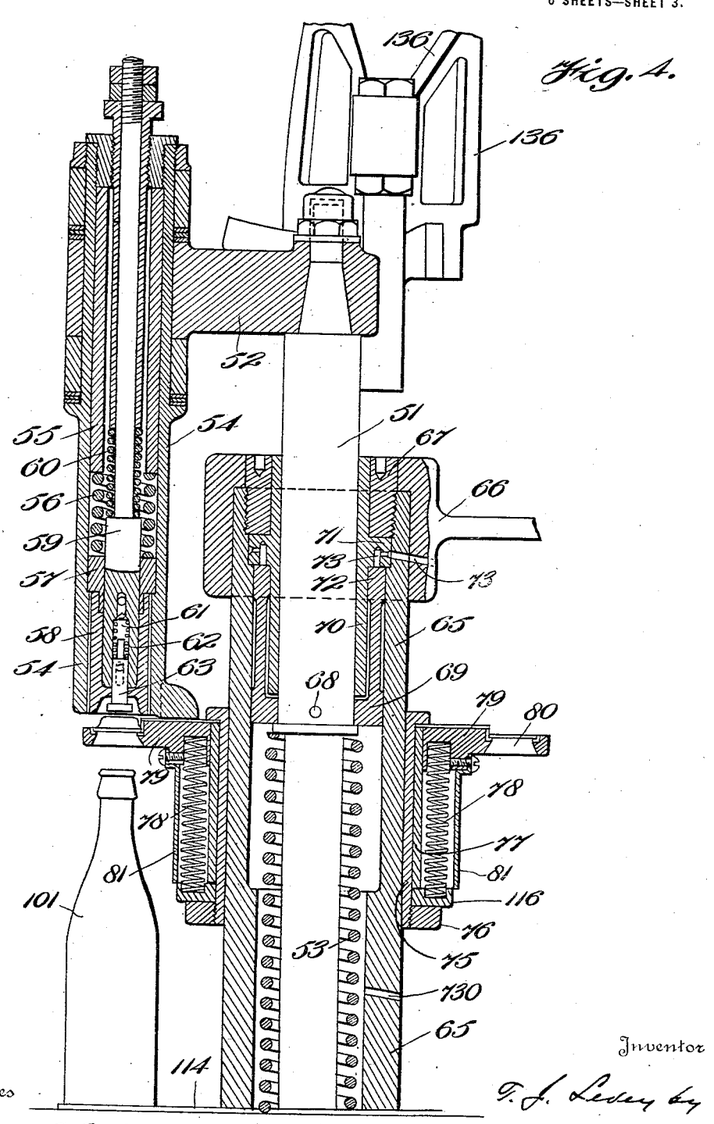
Fig. 4 is an enlarged sectional view of the plunger mechanism for applying the caps to the bottles.

When the rack 26 through the pinion 50 on the shaft 3 is reciprocated in the manner disclosed in my patent above, it causes the standard 51 to be likewise reciprocated and to therefore reciprocate the arm 52 of the bottle capping head as will be clear from my patent above. This bottle capping head as best shown in Fig. 4 comprises a spring 53 surrounding the standard 51, a sleeve 54 carried by said arm 52, an inner sleeve 55, a spring 56, a second sleeve 57, a capping member 58 and an internal reciprocating member 59 associated with an inner spring 60 all as will be clear from Fig. 1 of the drawings, as well as from my Patent 997,142, above. The lower end of the reciprocating member 59 is hollowed out as shown at 61, and is provided with the spring 62 carrying the slotted cap holding member 63. Rising from the table 40 and surrounding the spring 53 and standard 51 is the hollow standard 65 over the top of which fits the arm 66 carrying the hollow nut 67 screw threaded into the top of said hollow standard 65 as shown. Secured to the standard 51 as by the pin 68 is the hollow cup member 69 (Fig. 4) fitting on one side the inner surface of the hollow standard 65 and fitting on its inner wall the sleeve 70 which surrounds the standard 51 and which is provided with the ring 71 against which the nut 67 fits on one side and the said cup member 69 fits on its other side. The upper end 72 of the cup member 69 thus forms a hollow piston sliding between the members 65 and 70 and adapted to compress the air caught between said members as the said standard 51 and sleeve 70 move up and down. 73 represents a valved escape for the air thus imprisoned, and the parts just disclosed constitute a cushioning member to cushion and soften the up and down strokes of the bottle head. 730 represents an escape for the air imprisoned on the downward stroke of the piston 72. Surrounding the hollow standard 65 is also the sleeve 75 provided with the ring 76 at its lower end, on which rests the ring member 116 supporting the ring or tubular member 77 provided with the angular projections 770, between which the members 79 reciprocate, see Figs. 13 and 14, and outside said member 77 are the springs 78 controlling the up and down movement of the sector member 79 provided with the orifices 80, through which the bottle caps may pass. 81 represents covers attached to the sectors 79 adapted to slide up and down therewith and to protect the springs 78, all as will be clear from Fig. 14.

From the mechanism now disclosed it will be clear that upon reciprocating the standard 51 by means of the rack 26 and clutch 25, the capping head including the members 54, 58 and 63 will be likewise reciprocated, and that the member 54 will cause a sector member 79 adapted to carry a bottle cap, to descend down over the mouth of a bottle 101, thus compressing the springs 78, and thus allowing the air to pass in above the hollow piston 72 through the valved passage 73. It will further be clear that as the standard 51 rises the air which has been sucked in above the piston 72 will be caught and thus cushion the upward motion of the bottle head in a manner which will be readily understood.

Figure 5:
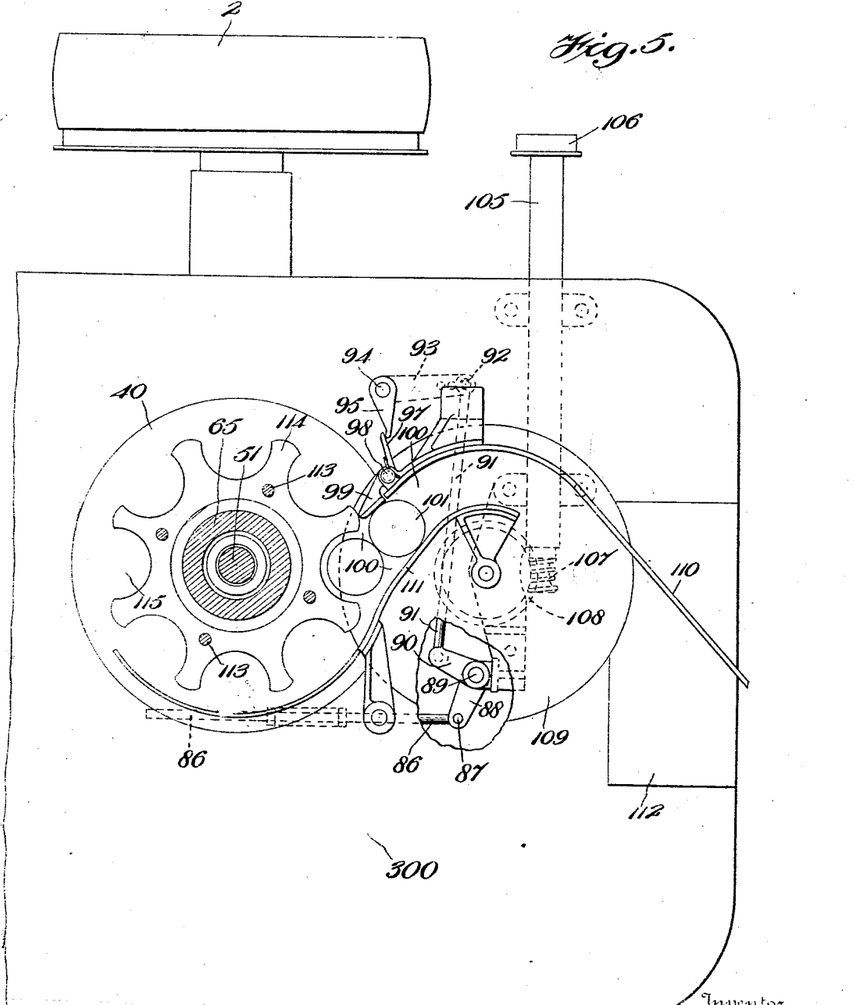
Fig. 5 is an enlarged plan view partly in section of the table and mechanism for feeding bottles to the machine.
Figure 6:
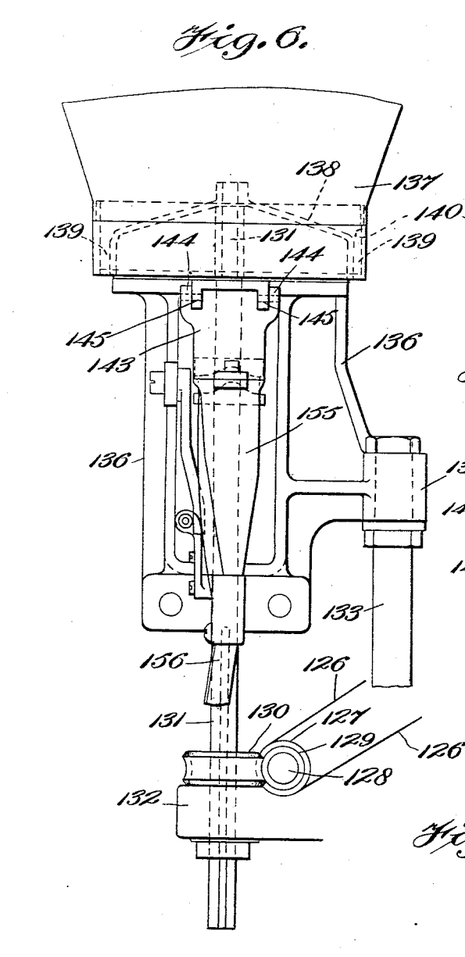
Fig. 6 is an enlarged elevational view of the upper part of the cap feeding mechanism.
Figure 7:
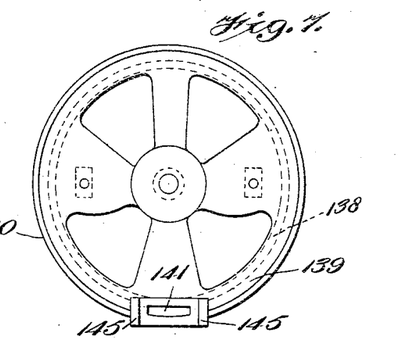
Fig. 7 is a bottom plan view of the bottom of the hopper.
Figure 8:
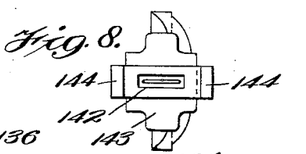
Fig. 8 is a plan view of the cap distributer.
Figures 9, 10, 11:
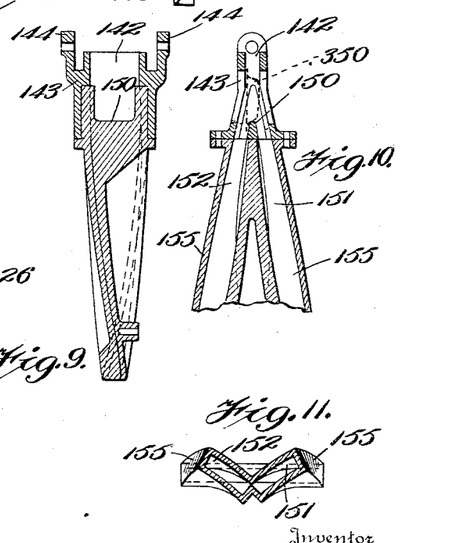

The means for feeding bottles to the table 40 will now be described, especial reference being had to Figs. 2 and 5. Connected with the lever 30 as at 85 is the reciprocating rod 86 to which is pivoted as at 87 the arm 88 fast to the rod 89 carrying another arm 90 to which is pivoted the reciprocating rod 91 attached at 92 to an arm 93 of a bell crank pivoted at 94, the other arm 95 of which contacts with the spring controlled arm 97 of a latch pivoted at 98 and provided with the member 99 adapted to move in and out the path 100 of the bottles 101. In other words, it will be clear that as the rod 86 reciprocates the latch 99 moves into and out of said path to permit bottles to pass one at a time. Secured to the frame of the machine is a short shaft 105 operated by the pulley 106 and provided at one end with the worm 107 adapted to engage the gear 108 attached to the circular feeding disk 109 flush with the bottle platform 112 as will be clear from Figs. 2 and 5. Said platform is raised slightly above the table 300. A guide 110 is provided to cause the bottles to move into the path 100 and a guide 111 is likewise provided to hold said bottles into said path as the disk 109 rotates. Located slightly below the surface of the table 300 is the bottle table 40, which is rotated by the pinion 38 and gear 39 in the manner above described. This bottle table underlies the revolving feeding disk 109 as shown; and rising from the said table 40 are a plurality of standards 113 passing through a circular bottle support 114 provided with cutaway places 115 adapted to receive the bodies of the bottles. The said standards 113 also pass upwardly through the ring member 116 resting on the ring 76, and provided with the holes 117, Fig. 15, for the standards 113 and the depressions 118 for the springs 78. As will be clear from Figs. 13, 14, and 15, the sector members 79 are provided with end members 121 fitting the guides 120 in the sleeve 77, and are adapted to independently slide up and down said sleeve when actuated by the bottle capping head, and under the control of the springs 78. Associated with the member 66 is a platform or rest 122 on which a motor 123 may be located, see Fig. 2, and by means of the belt 124 transmit power to the pulley 2. A belt 126 may also lead from said motor to the small pulley 127 on the shaft 128 carrying the worm 129 meshing with the gear 130 splined on the vertical shaft 131 mounted in the standard 132 rigid with the member 66. A guide rod 133 provided with a rack 134, may be moved up and down through the standard or bracket 132, by means of the pinion 135 mounted on said bracket 132, as clearly shown in Fig. 2. The said guide rod 133 extends down to and is rigid with the sleeve 75 carrying the sleeve member 77 and sectors 79; and therefore when adjusted up and down said sector members 79, ring member 116 and associated parts are likewise adjusted to accommodate bottles of different heights. By this means I make provision for capping bottles of different heights, lengths, sizes or capacities. The bracket 136 is mounted on the upper end of said rod 133 and carries the hopper 137 into which said rotating shaft 131 leads. Mounted on said shaft inside said hopper is the bell shaped member 138, leaving the annular space 139 adapted to receive bottle caps and to hold them on their edges. The bottom of said hopper 140 is shaped as illustrated in Fig. 7 and leading out of the same is the single outlet 141 of a size just sufficient to pass a single cap when resting on its edge. Registering with the orifice 141 is the mouth 142 of the oscillating cap distributing member 143 pivoted as at 144 to the lugs 145 of the bottom member 140. The passage or mouth 142 is shaped as shown in Figs. 8, 9 and 10 and the member 150 divides it into the passages 151 and 152. The upper ends or beginnings of these said passages like the mouth 142 are just sufficiently wide to pass a bottle cap 350 edgewise and when such cap is presented to the passage 151 for example with its flange on its right hand side as seen in Fig. 10, then the body or cup portion of said cap will successfully pass the dividing member 150, and the cap will travel on down the passage 151. On the other hand if the flange of the cap 350 should be presented toward the left as seen in Fig. 10, and as is indicated in dotted lines in said figure; it projects over into the passage 152 as indicated, and the said cap will tip and follow the passage 152. The passages 151 and 152 are oppositely twisted to cause all caps to fall in the same direction as will be more fully disclosed. It will now be clear that only caps with their flanges turned toward the right as seen in Fig. 10 will follow the passage 151, while only caps with their flanges turned toward the left will follow passage 152. The oscillating member 155 provided with the said passages is preferably fitted to the mouth member 143 as shown and normally both its passages will be filled with caps, which are delivered one at a time to the chute or passage 156, curved as shown, and extending down to the opening 80 in the sector members 79, to which members' caps are delivered right side up one at a time.

In order to cause all caps which enter the oscillating member 155, to be turned the right way upon entering the chute 156, I give the passages receiving the caps a twist as indicated in Figs. 2, 6, 9, 10 and 11 which turns said caps in opposite directions sufficiently to cause them all to enter the chute 156 with their flanges occupying the proper position to be later received by the orifices 80 with their flanges down. In order to oscillate the member 155, and thereby prevent clogging as well as to compel said caps to enter said chute one at a time, I mount on rod or shaft 131 the cam 160, into the groove 161 of which fits the pin 162 carried by the arm 163 of a bell crank pivoted at 164, and having the downwardly extending arm 165. Mounted on the oscillating member 155, is the bracket 164, through which the rod 166 passes, and against which one end of the springs 167 and 168, surrounding said rod, are adapted to press. The other end of the spring 168 rests against the nut 169 on said rod, and the other end of the spring 167 rests against the enlarged end 170 of said rod which is pivoted to the bell crank arm 165 at 171.

It results from the construction just described that as the cam groove 161 revolves, the rod 166 will oscillate and cause the lower curved surface of the member 155 to oscillate over the upper curved surface 173 of the chute 156; and as the chute is only large enough to receive caps one at a time, the said caps are fed one after another into said chute, and thence to the openings 80. The rod or shaft 131 being continuously turned, should a cap get jammed the spring 167 will be compressed on one stroke and the spring 168 will be compressed on the other, so no harm will result.

The operation of my invention will be clear from the foregoing but may be briefly summarized as follows: Power being transmitted from the motor 123 through the belt 124 to the pulley 2 and the clutch 4 being operated either through the handle 13 or the treadle 14, the shaft 3 will be turned and with it the clutch 25 and clutch sleeve 250. Power will be transmitted through said sleeve 250 to the rack member 26, which in turn will cause the standard 51, arm 52 and capping head 54 to descend. Should a bottle be abnormally long or should an abnormal resistance to the descent of said head be encountered for any other cause, the clutch 25 will disconnect as disclosed in my said Patent No. 997,142 above, and prevent injury to the parts. As the shaft 3 revolves it also imparts motion to the crank 27, pitman 28, and three part crank composed of lever 30, arm 32 and arm 47. As the arm or lever 32 oscillates it operates the ratchet 34, and causes the gears 36, 38 and 39 to turn the bottle conveying table 40. The arm 47 at the same time strikes the dog 44 and lowers the locking rod 42 to unlock said table 40. On the return movement, the arm 32 strikes said dog 44 from the other side and returns it to its former position and thereby permits said rod 42 to relock the table 40. During the time the table is unlocked it is rotated sufficiently to find a new bottle under the capping head. The table or disk 109 feeds bottles to the table 40, and receives its motion through the worm 107 and gear 108. The bottles are caused to feed one at a time to the table 40, by means of the latch 99, controlled by the levers 95, 93, rod 91, levers 90 and 88 and reciprocating rod 86 pivoted to the lever 30. Caps are fed out of the hopper 137 through the orifice 141 and separated into the twisted passages 151 and 152, in which they are all caused to face the same way, whereupon they are fed to the chute 156 and to the orifices 80 above the bottle heads. The bottle capping head descends, and forces down the sectors 79 one at a time, whereupon the bottle heads passing through said openings 80, the caps are applied. The automatic rotation of the table 40, causes new bottles to be brought beneath the caps, and the process continues. By adjusting the guide rod 133 up or down, the distance between the bottle table 40 and the capping sectors 79 will be varied, and therefore bottles of different lengths or sizes can be readily capped. As the standard 51 and bottle head 54 moves up and down, their motions are cushioned by reason of air being imprisoned above the piston 72.

It is obvious that those skilled in the art may vary the details of construction as well as the arrangement of parts without departing from the spirit of my invention, and therefore I do not wish to be limited to the above disclosure except as may be required by the claims.

What I claim is:—

1. In a bottle capping machine, the combination of a power shaft provided with a pulley, an automatic clutch associated with said shaft; a bottle capping head; connections between said head and clutch for imparting a reciprocating motion to said head; a crank carried by said shaft; a bottle supporting table; connections between said crank and table for rotating the table and moving bottles to be capped under said head; a reciprocating locking rod adapted to be operated by said last named connections for locking said table at predetermined intervals; a disk overlapping said table adapted to feed bottles thereto; and connections between said pulley and disk for rotating the latter; substantially as described.

2. In a bottle capping machine the combination of a power shaft provided with a pulley, an automatic clutch provided with a pinion associated with said shaft; a bottle capping head; connections comprising a reciprocating rack meshing with said pinion between said head and clutch for imparting a reciprocating motion to said head; a crank carried by said shaft; a bottle supporting table; connections between said crank and table comprising a gear; a pinion meshing with said gear for rotating the table and moving bottles to be capped under said head; a reciprocating locking rod adapted to be operated by said last named connections for locking said table at predetermined intervals; a disk overlapping said table adapted to feed bottles thereto; and connections between said pulley and disk for rotating the latter, substantially as described.

3. In a bottle capping machine the combination of a power shaft, an automatic clutch associated with said shaft; a bottle capping head, connections between said head and clutch for imparting a reciprocating motion to said head; means for feeding caps in proximity to said head; readily depressible means for holding said caps under said head; a crank carried by said shaft; a bottle supporting table; connections between said crank and table for rotating the table and moving bottles to be capped under said head, a reciprocating locking rod adapted to be operated by said last named connections for locking said table at predetermined intervals; a disk overlapping said table adapted to feed bottles thereto; and connections between said pulley and disk for rotating the latter; substantially as described.

4. In a bottle capping machine the combination of a power shaft, an automatic clutch associated with said shaft; a bottle capping head; connections between said head and clutch for imparting a reciprocating motion to said head; means for feeding caps in proximity to said head; means for causing said caps to all face the same way before being fed to said head; readily depressible means for holding said caps under said head; a crank carried by said shaft; a bottle supporting table; connections between said crank and table for rotating the table and moving bottles to be capped under said head, a reciprocating locking rod adapted to be operated by said last named connections for locking said table at predetermined intervals; a disk overlapping said table adapted to feed bottles thereto; and connections between said pulley and disk for rotating the latter; substantially as described.

5. In a bottle capping machine the combination of a power shaft, an automatic clutch associated with said shaft; a bottle capping head; connections between said head and clutch for imparting a reciprocating motion to said head; a crank carried by said shaft; a bottle supporting table; a rotating disk adapted to feed bottles to said table; connections between said shaft and disk for rotating the disk; connections between said crank and table for rotating the table and moving bottles to be capped under said head, a latch associated with said disk for controlling the passage of bottles from said disk to said table; and means controlled by said last named connections for operating said latch; substantially as described.

6. In a bottle capping machine the combination of a power shaft, an automatic clutch associated with said shaft; a bottle capping head; connections between said head and clutch for imparting a reciprocating motion to said head; a crank carried by said shaft, a bottle supporting table; a rotating disk adapted to feed bottles to said table; connections between said shaft and disk for rotating the disk; controlling means to cause bottles to be fed one at a time from said disk to said table; connections between said crank and table for rotating the table and moving bottles to be capped under said head, and means controlled by said last named connections for operating said controlling means; substantially as described.

7. In a bottle capping machine the combination of a power shaft; a reciprocating bottle capping head; connections between said shaft and head; pneumatic means to cushion the reciprocations of said head; a crank carried by said shaft, a pitman pivoted to said crank; a lever pivoted to said pitman; a pawl and ratchet operated by said lever; a rotating bottle carrying table; connections between said ratchet and said table for rotating the table; a rotating disk for feeding bottles to said table; controlling means for causing said bottles to be fed one at a time from said disk to said table; and connections between said lever and said controlling means, for operating the latter, substantially as described.

8. In a bottle capping machine the combination of a power shaft; a reciprocating bottle capping head; means to feed caps in proximity to said head; depressible means for holding the fed caps beneath said head; connections between said shaft and head; pneumatic means to cushion the reciprocations of said head; a crank carried by said shaft; a pitman pivoted to said crank; a lever pivoted to said pitman; a pawl and ratchet operated by said lever; a rotating bottle carrying table; connections between said ratchet and said table for rotating the table; a rotating disk for feeding bottles to said table; controlling means for causing said bottles to be fed one at a time from said disk to said table; and connections between said lever and said controlling means for operating the latter, substantially as described.

9. In a bottle capping machine the combination of a power shaft; a reciprocating bottle capping head; connections between said shaft and head; pneumatic means to cushion the reciprocations of said head; a crank carried by said shaft; a pitman pivoted to said crank; a lever pivoted to said pitman; a pawl and ratchet operated by said lever; an oscillating arm operated by said lever; a rotating bottle carrying table; reciprocating means for locking and unlocking said table; a dog adapted to be operated by said arm for moving said reciprocating means in one direction; connections between said ratchet and said table for rotating the table; a rotating disk for feeding bottles to said table; controlling means for causing said bottles to be fed one at a time from said disk to said table; and connections between said lever and said controlling means for operating the latter, substantially as described.

10. In a bottle capping machine the combination of a power shaft; a reciprocating bottle capping head; connections between said shaft and head; pneumatic means to cushion the reciprocations of said head; a crank carried by said shaft; a pitman pivoted to said crank; a lever pivoted to said pitman; a pawl and ratchet operated by said lever; a rotating bottle carrying table; connections between said ratchet and table for rotating the table; a rotating disk for feeding bottles to said table; bottle guides associated with said table and disk; controlling means for causing said bottles to be fed one at a time from said disk to said table; and connections comprising a spring pressed latch, and operating levers and reciprocating rods between said lever and said controlling means for operating the latter, substantially as described.

11. In a bottle capping machine the combination of a power shaft; a reciprocating bottle capping head; connections between said shaft and head; a cushioning means associated with said connections; a rotating bottle carrying table; depressible sliding means for supporting bottle caps beneath said head and above bottles carried by said table; and connections for causing said depressible sliding means to rotate with said table and a rotary bottle feeding disk associated with said rotating table; substantially as described.

12. In a bottle capping machine the combination of a power shaft; a reciprocating bottle capping head; connections between said shaft and head; a cushioning means associated with said connections; means for feeding bottle caps in proximity to said head; a rotating bottle carrying table; depressible sliding means for supporting bottle caps beneath said head and above said bottles carried by said table; and connections for causing said depressible sliding means to rotate with said table, substantially as described.

13. In a bottle capping machine the combination of a power shaft; a reciprocating bottle capping head; connections between said shaft and head; a cushioning means associated with said connections; means for feeding bottle caps in proximity to said head; a rotating bottle carrying table; depressible sliding means for supporting bottle caps beneath said head and above bottles carried by said table; means for adjusting said sliding means up and down to accommodate bottles of different sizes; and connections for causing said depressible sliding means to rotate with said table, substantially as described.

14. In a bottle capping machine the combination of a power shaft; a reciprocating bottle capping head; connections between said shaft and head; a cushioning means associated with said connections; means for feeding bottle caps in proximity to said head; means for causing said fed caps to all face the same way; a rotating bottle carrying table; depressible sliding means for supporting bottle caps beneath said head and above the bottles carried by said table; means for moving said sliding means up and down to accommodate bottles of different sizes; springs for returning said depressible means; and connections for causing said depressible sliding means to rotate with said table, substantially as described.

15. In a bottle capping machine the combination of a power shaft; a rotating bottle carrying table; connections between said shaft and table for rotating the latter; means to feed bottles one at a time to said table; a reciprocating bottle capping head for applying caps to bottles carried by said table; depressible cap carrying sectors located above said bottle carrying table, rotating with said table and moving beneath said bottle capping head; means to feed caps to said sectors as they rotate; and means to adjust said sectors up and down to accommodate bottles of different sizes, substantially as described.

16. In a bottle capping machine the combination of a power shaft; a rotating bottle carrying table; connections between said shaft and table for rotating the latter; means to feed bottles one at a time to said table; a reciprocating bottle capping head for applying caps to bottles carried by said table; means to cushion the reciprocating movements of said head; depressible cap carrying sectors located above said bottle carrying table, rotating with said table and moving beneath said bottle capping head; means comprising a hopper and a chute to feed caps to said sectors as they rotate; means causing said caps to all face one way as they enter said chute; and means to adjust said sectors up and down to accommodate bottles of different sizes, substantially as described.

17. In a bottle capping machine the combination of a power shaft; a rotating bottle carrying table; connections between said shaft and table for rotating the latter; means to feed bottles one at a time to said table; a reciprocating bottle capping head for applying caps to bottles carried by said table; depressible cap carrying sectors located above said bottle carrying table, rotating with said table and moving beneath said bottle capping head; means comprising a hopper, a cap distributer and a chute to feed caps to said sectors as they rotate; a reciprocating member having twisted passages located between said distributer and chute to cause said caps to all face one way as they enter said chute; and means to adjust said sectors up and down to accommodate bottles of different sizes, substantially as described.

In testimony whereof I affix my signature in presence of two witnesses.

THOMAS EV.

Witnesses:
T. A. WITHERSPOON,
A. E. WALDEN.

Copies of this patent may be obtained for five cents each, by addressing the "Commissioner of Patents, Washington, D. C."